United States Patent
Micucci et al.

(10) Patent No.: US 12,258,867 B1
(45) Date of Patent: Mar. 25, 2025

(54) ATTACHMENT FOR BLADE OUTER AIR SEAL

(71) Applicant: RTX CORPORATION, Farmington, CT (US)

(72) Inventors: Joseph Micucci, Scarborough, ME (US); Daniel Rogers, Lyman, ME (US); Mikayla Rogers, Portland, ME (US); Danielle Mahoney, Granby, CT (US); Carson Roy Thill, Buxton, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/428,983

(22) Filed: Jan. 31, 2024

(51) Int. Cl.
*F01D 11/08* (2006.01)

(52) U.S. Cl.
CPC .......... *F01D 11/08* (2013.01); *F05D 2230/64* (2013.01); *F05D 2300/6033* (2013.01)

(58) Field of Classification Search
CPC ...... F01D 11/08; F01D 11/005; F01D 25/246; F05D 2220/323; F05D 2230/60; F05D 2240/11; F05D 2260/30; F05D 2300/6033
See application file for complete search history.

(56) References Cited

U.S. PATENT DOCUMENTS

| | | | |
|---|---|---|---|
| 11,041,399 B2* | 6/2021 | Lutjen | F01D 5/14 |
| 11,174,795 B2* | 11/2021 | Lutjen | F01D 11/005 |
| 11,255,210 B1* | 2/2022 | Freeman | F01D 11/16 |
| 11,286,812 B1* | 3/2022 | Freeman | F01D 25/246 |
| 11,466,585 B2* | 10/2022 | Arbona | F01D 25/246 |
| 2020/0224544 A1* | 7/2020 | Barker | F01D 11/08 |
| 2021/0285334 A1* | 9/2021 | Arbona | F01D 25/246 |

* cited by examiner

*Primary Examiner* — David E Sosnowski
*Assistant Examiner* — Maxime M Adjagbe
(74) *Attorney, Agent, or Firm* — Carlson, Gaskey & Olds, P.C.

(57) ABSTRACT

A turbine section for a gas turbine engine includes a turbine having at least one blade rotatable around an axis. The at least one blade has a tip. The turbine section for a gas turbine engine also includes at least one blade outer air seal arranged radially outward from the tip. The blade outer air seal has a center web and first and second mounting arms extending from the center web. Each of the first and second mounting arms include at least one aperture configured to receive a pin to attach the blade outer air seal to an engine static structure. A gas turbine engine and a method of attaching a blade outer air seal to a static structure of a gas turbine engine are also disclosed.

4 Claims, 2 Drawing Sheets

ATTACHMENT FOR BLADE OUTER AIR SEAL

BACKGROUND OF THE INVENTION

This application relates to the use of machinable coatings to provide sealing surfaces on a blade outer air seal.

Gas turbine engines typically include a fan delivering air into a bypass duct as propulsion air, and into a core engine. The core engine air moves into a compressor section where it is compressed and delivered into a combustor. The air is mixed with fuel and ignited in the combustor and passed downstream over turbine rotors driving them to rotate. The turbine rotors in turn rotate the fan and compressor rotors.

Improving the efficiency of gas turbine engines is important. To maximize the volume of the products of combustion passing over the turbine rotors, a blade outer air seal ("BOAS") is placed radially outwardly of turbine blades to block the flow of products of combustion from avoiding the turbine blades. The BOAS is attached to engine casing structures. There is a need for improved attachments for securing a BOAS to engine casing structures.

SUMMARY OF THE INVENTION

A turbine section for a gas turbine engine according to an exemplary embodiment of this disclosure, among other possible things includes a turbine having at least one blade rotatable around an axis. The at least one blade has a tip. The turbine section for a gas turbine engine also includes at least one blade outer air seal arranged radially outward from the tip. The blade outer air seal has a center web and first and second mounting arms extending from the center web. Each of the first and second mounting arms include at least one aperture configured to receive a pin to attach the blade outer air seal to an engine static structure.

In a further example of the foregoing, the pin extends between a first end and a second end. One of the first and second ends is tapered.

In a further embodiment of any of the foregoing embodiments, the blade outer air seal comprises a ceramic matrix composite or a monolithic ceramic material.

In a further embodiment of any of the foregoing embodiments, the pin is received in the at least one aperture in the first and second mounting arms in a slip-fit relationship.

In a further embodiment of any of the foregoing embodiments, the pin has a diameter that is about 0.5 mils smaller than a diameter of the apertures.

A gas turbine engine according to an exemplary embodiment of this disclosure, among other possible things includes a turbine section arranged along a central engine axis. The turbine section has a turbine with at least one blade rotatable around the central engine axis, at least one blade has a tip. The gas turbine engine also includes at least one blade outer air seal arranged radially outward from the tip. The blade outer air seal has a center web and first and second mounting arms extending from the center web. Each of the first and second mounting arms include at least one aperture configured to receive a pin. The gas turbine engine also includes a static structure. The static structure includes first and second flanges. Each of the first and second flanges includes at least one aperture configured to receive the pin to attach the blade outer air seal to the static structure.

In a further example of the foregoing, the aperture in the second flange is a pocket.

In a further embodiment of any of the foregoing embodiments, the second flange is aft of the first flange along the central engine axis.

In a further embodiment of any of the foregoing embodiments, the pin extends between a first end and a second end, wherein the second end is tapered, and wherein the second end is received in the pocket.

In a further embodiment of any of the foregoing embodiments, a length of a taper of the second end is smaller than a length of the pocket.

In a further embodiment of any of the foregoing embodiments, the second end has a flat face that is configured to abut an aft face of the pocket.

In a further embodiment of any of the foregoing embodiments, the pin extends between a first end and a second end. One of the first and second ends is tapered.

In a further embodiment of any of the foregoing embodiments, the pin is received in the at least one aperture in each of the first and second mounting arms in the blade outer air seal and the at least one aperture in the static structure in a slip-fit relationship.

In a further embodiment of any of the foregoing embodiments, the blade outer air seal comprises a ceramic matrix composite or a monolithic ceramic material.

In a further embodiment of any of the foregoing embodiments, the gas turbine engine includes a seal plate arranged forward of the blade outer air seal and configured to limit axial movement of the pin in a forward direction.

A method of attaching a blade outer air seal to a static structure of a gas turbine engine according to an exemplary embodiment of this disclosure, among other possible things includes aligning first and second apertures in a blade outer air seal with first and second apertures in an engine static structure. The method also includes inserting a pin into the first and second apertures in the blade outer air seal and first and second apertures in the engine static structure to attach the blade outer air seal to the engine static structure.

In a further example of the foregoing, the inserting is in an aftward direction along a central axis of the gas turbine engine.

In a further embodiment of any of the foregoing embodiments, the pin extends from a first and to a second, tapered end. The inserting begins with the tapered end.

In a further embodiment of any of the foregoing embodiments, the second aperture in the engine static structure is a pocket. A face of the tapered end of the pin engages an aft face of the pocket after the inserting.

In a further embodiment of any of the foregoing embodiments, the method also includes, after the inserting, limiting axial movement of the pin in a forward direction by providing a seal ring forward from the blade outer air seal.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
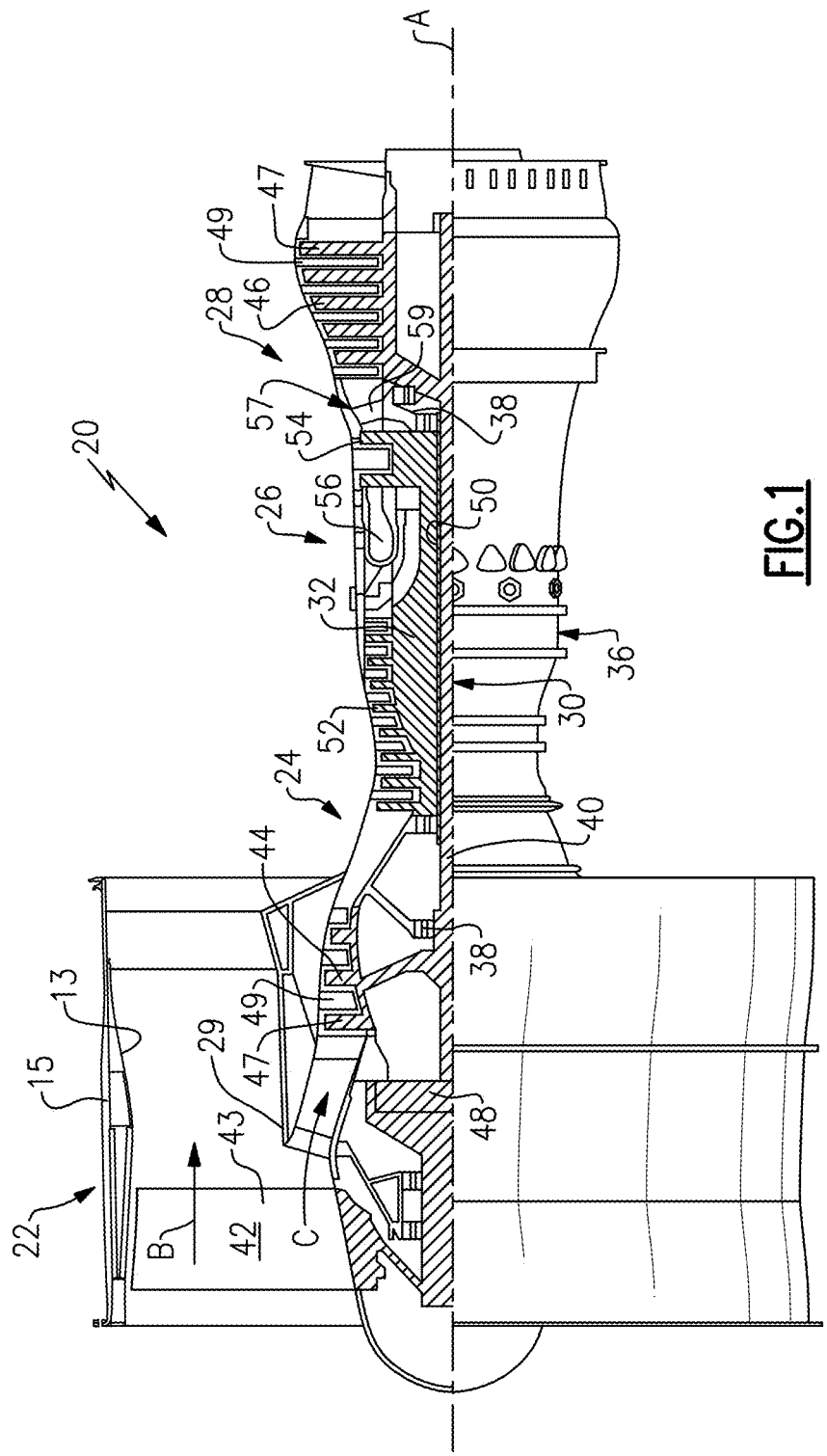
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram \degree R)/(518.7\degree R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
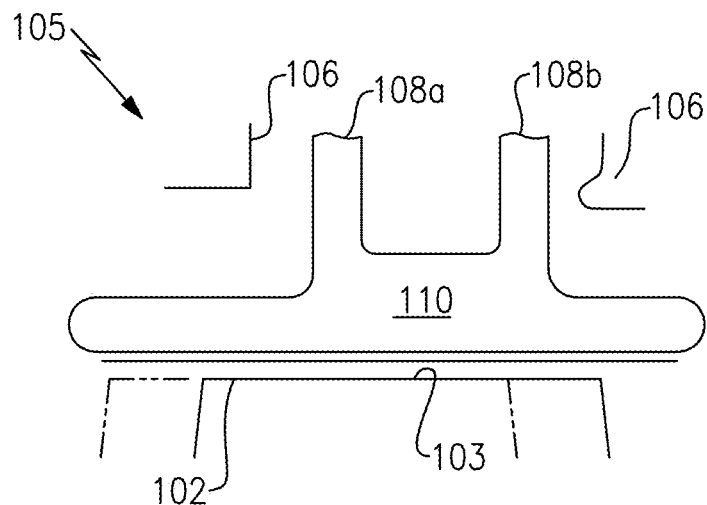
FIG. 2A shows a turbine section of the gas turbine engine in FIG. 1.

FIG. 2A shows a turbine section 28 having rotating turbine blades 102 with a radially outer tip 103. A vane (not shown in FIG. 2A) is positioned upstream of the turbine blade 102. In one example the turbine blade 102 is a blade of the high pressure turbine 54 (FIG. 1). A blade outer air seal (BOAS) 105 is positioned radially outwardly of the tip 103 with respect to a central engine axis. A plurality of BOAS (not shown) are arranged circumferentially round the central engine axis A (FIG. 1).

The static structure 106 may be an engine 20 casing structure.

The BOAS 105 has two mount arms 108a/108b which extend generally perpendicular from a center web 110. The center web 110 is arranged adjacent the tip 103 of the turbine blade 102 when the BOAS 105 is attached to the static structure 106.

In one example, the BOAS 105 is formed out of ceramic matrix composite materials ("CMCs") or a monolithic ceramic. A CMC material is comprised of one or more ceramic reinforcement plies in a ceramic matrix. Example ceramic matrices are silicon-containing ceramic, such as but not limited to, a silicon carbide (SiC) matrix or a silicon nitride ($Si_3N_4$) matrix. Example ceramic reinforcement of the CMC are silicon-containing ceramic fibers, such as but not limited to, silicon carbide (SiC) fiber or silicon nitride ($Si_3N_4$) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcements and is formed of a single material.

Example monolithic ceramics include silicon-containing ceramics, such as silicon carbide (SiC) or silicon nitride (Si3N4).

CMC or monolithic ceramic materials have good temperature and environmental capabilities compared to metallic components. However, improvements can be made for mounting CMC BOAS to static structures in the engine 20 over the attachment schemes used for metallic BOAS, which improvements will be discussed in detail below.

Figure 2B:
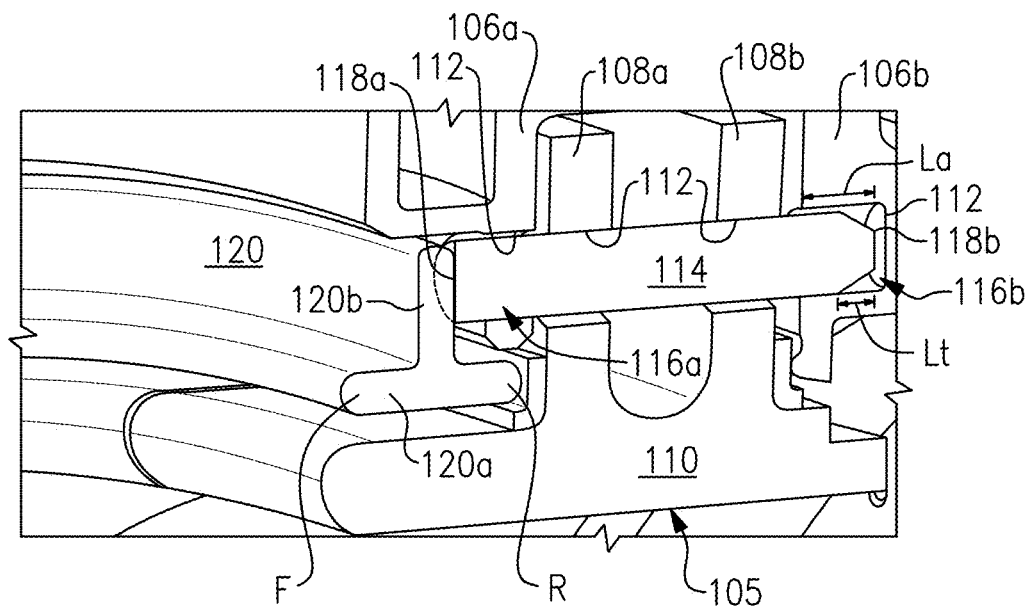
FIG. 2B shows a cross-section of the turbine section in FIG. 2A.

Turning now to FIG. 2B, the static structure 106 includes two flanges 106a/106b, corresponding to the mounting arms 108a/108b, respectively. The flange 106a is forward of the flange 106b along the central engine axis A (FIG. 1). Each of the flanges 106a/106b and the mounting arms 108a/108b includes an aperture 112 configured to receive a pin 114. The pin 114 extends between first and second ends 116a/116b. In one example, at least one end of the pin 114 is tapered. Both ends 116a/116b of the pin 114 have a flat face 118a/118b. In the example of FIG. 2B, the second end 116b is tapered to the flat face 118b. When the pin 114 is installed in the engine 20 as shown in FIG. 2B, the second end 116b is aft of the first end 116a.

The apertures 112 are formed in the BOAS 105 and static structure 106 according to any method suitable for the material of those components. For instance, for a CMC BOAS 105, the apertures 112 can be formed by grinding, ultrasonic machining, or water-guided laser, for instance.

In the example of FIG. 2B, an aperture 112 extends through the entirety of the forward flange 106a and both mounting arms 108a/108b. The aperture 112 of aft flange 106b is a pocket configured to receive the second end 116b of the pin 114. The pocket 112 in the flange 106b limits axial movement of the pin 114 in the aft direction. In a particular example, the tapered section of the pin 114 at the second end 116b has a length Lt and the aperture 112 in the aft flange 116b las a length La. The length La is longer than the length Lt.

The pin 114 is configured to fit in the apertures 112 in a slip-fit relationship. That is, the pin 114 has a diameter that is very slightly smaller than a diameter of the apertures 112. In one example, the diameter of the pin 114 is about 0.5 mils small than the diameter of the apertures 112. The diameter of the pin 114 can be, for instance, between about 125-about 250 mils.

A seal plate 120 is arranged forward of the BOAS 105 and provides a secondary seal together with the BOAS 105. The seal plate 120 is a full-hoop ring that includes an axial portion 120a and a radial portion 120b extending radially outward from the axial portion 120a with respect to the central engine axis A. As can be seen in FIG. 2B, the axial portion 120a actually has a forward axially extending portion F and a rear axially extending portion R. The axial portion 120a R extends in an axial direction radially inward from the flange 106a with respect to the central engine axis A such that at least part of the axial portion 120a overlaps the position of the pin 114. The radial portion 120b abuts the flange 106a and retains the pin 114 in the installed position shown in FIG. 2B by preventing axial movement of the pin 114 in a forward direction. The seal plate 120 can be secured to the static structure 106 by any known means.

In one example, the apertures 112 in the flanges 106a/106b and BOAS 105 are aligned, and then the pin 114 is inserted into the apertures 112 beginning with the tapered second end 116b in an aftward direction until the second end 116b engages the pocket 112 in the flange 106b. In a particular example shown in FIG. 2B, when the pin 114 is installed in the engine 20, the flat face 118a of the first end 116a is substantially flush with a forward face of the flange 106a and the flat face 118b of the second, tapered end 116b engages an aft face of the pocket 112 in the second flange 106b. The seal plate 120 is then installed to the position discussed above.

In one example, each BOAS includes two pins 114. However in other examples, one pin 114 or more than two pin 114 can be used.

The pin 114 comprises a high-temperature material such as cobalt, nickel, an alloy of cobalt or nickel, or a combination thereof. The pin 114 may include a thermal barrier coating, environmental barrier coating, or other coating as are known in the art.

The pin 114 attachment scheme discussed herein provides a secure attachment for the BOAS 105 to the static structure 106 of the engine 20 that is not prone to shifting during engine 20 operation. Therefore, a predictable tip 103 clearance is achieved, which contributes to engine 20 performance. The attachment scheme is also housed within the BOAS 105, reducing the stack-up size of the BOAS 105 as compared to BOAS that use other attachment schemes. The pin 114 is also relatively simple to manufacture as are the apertures 112, reducing the complexity and cost of forming and assembling the BOAS 105 with the static structure 106.

As used herein, the term "about" and "approximately" have the typical meanings in the art, however in a particular example "about" and "approximately" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
   a turbine section arranged along a central engine axis, the turbine section having a turbine with at least one blade rotatable around the central engine axis, the at least one blade having a tip;
   at least one blade outer air seal arranged radially outward from the tip, the blade outer air seal having a center web and first and second mounting arms extending from the center web, wherein each of the first and second mounting arms include at least one aperture configured to receive a pin;
   a static structure, the static structure including first and second flanges, each of the first and second flanges including at least one aperture configured to receive the pin to attach the blade outer air seal to the static structure;
   a seal plate that extends for an entire circumference of the blade outer air seal, with the at least one blade outer air seal including a plurality of blade outer air seal segments, the seal plate abutting the first flange at an upstream location;
   wherein the aperture in the second flange is a pocket;
   wherein the second flange is aft of the first flange along the central engine axis;

wherein the pin extends between a first end and a second end, wherein the second end is tapered, and wherein the second end is received in the pocket;

wherein a length of a taper of the second end is smaller than a length of the pocket;

the pin comprising a high-temperature material selected from cobalt, nickel, an alloy of cobalt or nickel, or a combination thereof; and wherein the seal plate has a radially extending portion abutting the first flange, and an axially extending portion extending in both a forward direction and a rear direction from the radial portion, with the axial portion extending in the rear direction extending radially inward of the first flange.

2. The gas turbine engine of claim 1, wherein the second end has a flat face that is configured to abut an aft face of the pocket.

3. The gas turbine engine of claim 1, wherein the blade outer air seal comprises a ceramic matrix composite or a monolithic ceramic material.

4. The gas turbine engine of claim 1, wherein the pin includes at least one of a thermal barrier coating or an environmental barrier coating.

\* \* \* \* \*